US010067900B2

(12) United States Patent
Watkins et al.

(10) Patent No.: US 10,067,900 B2
(45) Date of Patent: Sep. 4, 2018

(54) VIRTUALIZED I/O DEVICE SHARING WITHIN A DISTRIBUTED PROCESSING NODE SYSTEM

(71) Applicant: Oracle International Corporation, Redwood City, CA (US)

(72) Inventors: John E. Watkins, Sunnyvale, CA (US); Aron J. Silverton, Chicago, IL (US); Lance G. Hartmann, Austin, TX (US); Kenneth S Goss, Round Rock, TX (US)

(73) Assignee: Oracle International Corporation, Redwood City, CA (US)

( * ) Notice: Subject to any disclaimer, the term of this patent is extended or adjusted under 35 U.S.C. 154(b) by 423 days.

(21) Appl. No.: 14/835,646

(22) Filed: Aug. 25, 2015

(65) Prior Publication Data

US 2017/0060800 A1  Mar. 2, 2017

(51) Int. Cl.
*G06F 13/00* (2006.01)
*G06F 13/40* (2006.01)
*G06F 13/362* (2006.01)

(52) U.S. Cl.
CPC ........ *G06F 13/4022* (2013.01); *G06F 13/362* (2013.01); *G06F 13/4068* (2013.01)

(58) Field of Classification Search
None
See application file for complete search history.

(56) References Cited

U.S. PATENT DOCUMENTS

| | | |
|---|---|---|
| 2004/0210678 A1 | 10/2004 | Pettey et al. |
| 2006/0184711 A1 | 8/2006 | Pettey et al. |
| 2008/0288664 A1 | 11/2008 | Pettey et al. |
| 2009/0133016 A1 | 5/2009 | Brown et al. |
| 2009/0133028 A1 | 5/2009 | Brown et al. |
| 2009/0144731 A1* | 6/2009 | Brown .................. G06F 13/102 718/1 |
| 2009/0248947 A1 | 10/2009 | Malwankar et al. |
| 2009/0276773 A1 | 11/2009 | Brown et al. |
| 2009/0292960 A1* | 11/2009 | Haraden ............. G06F 11/0745 714/699 |
| 2014/0075006 A1* | 3/2014 | Cherian .................. H04L 41/04 709/223 |

* cited by examiner

*Primary Examiner* — Idriss N Alrobaye
*Assistant Examiner* — Richard B Franklin
(74) *Attorney, Agent, or Firm* — Robert C. Kowert; Meyertons, Hood, Kivlin, Kowert & Goetzel, P.C.

(57) ABSTRACT

A system that includes a switched fabric hierarchy (e.g., a PCIe hierarchy) may realize efficient utilization of a shared I/O device (e.g., a network or storage switch) across multiple physically separate processing nodes (endpoints). For example, each processing node (endpoint) in a distributed processing system may be allocated a portion of the address map of a shared I/O device and may host a device driver for one of multiple virtual functions implemented on the shared device. Following enumeration and initialization of the hierarchy by the root complex, the endpoints may access the virtual functions directly (without intervention by the root complex). Data and interrupt traffic between endpoints and virtual functions may take place over peer-to-peer connections. Interrupt reception logic in each endpoint may receive and handle interrupts generated by the virtual functions. The root complex may host a device driver for a physical function on the shared device.

18 Claims, 11 Drawing Sheets

VIRTUALIZED I/O DEVICE SHARING WITHIN A DISTRIBUTED PROCESSING NODE SYSTEM

BACKGROUND

Technical Field

This disclosure relates to computing systems, and more particularly, to techniques for implementing virtualized I/O device sharing within a distributed processing node system.

Description of the Related Art

Computer systems may include multiple processors or nodes, each of which may include multiple processing cores. Such systems may also include various Input/Output (I/O) devices, which each processor may send data to or receive data from. For example, I/O devices may include network interface cards (NICs) or network adapters that allow the processors to communicate with other computer systems, and external peripherals such as printers. Various forms of storage devices, such as mechanical and solid-state disk drives, may also be included with a computing system. In some systems, such I/O devices may send interrupts to signal various events. For example, an I/O device may send an interrupt to signal the completion of a direct memory access (DMA) operation or another type of operation. An I/O device may send a message to inform software of an internally detected error, or of an error on an I/O link coupled to the I/O device.

System I/O architectures such as PCI Express (PCIe) have become extremely successful and adopted throughout the computer industry. Within a PCIe hierarchy, one node is designated as the root complex within the fabric and is responsible for resource allocation for itself and all other fabric nodes (e.g., various switches and endpoint devices). Some systems include an I/O device as one of the endpoint devices, and high bandwidth communications (data and interrupts) take place between the I/O device and the root complex. Methods to share a single I/O device amongst multiple device drivers or virtual machine instances residing within one hardware processing unit have been designed and implemented for some time. Standards such as the PCI Express Single-Root I/O Virtualization (PCIe SR-IOV) specification describe one method, and many peripheral devices in the computer industry have been designed to this standard. Alternatively, some cluster-based systems have provided means for sharing devices at the operating system (OS) level. For example, one currently available kernel allows a device that is physically attached to one node to be managed, via a message-passing system, by another node in the cluster.

SUMMARY

Various embodiments of a system, an apparatus, and methods for implementing virtualized I/O device sharing within a distributed processing node system are described herein. In some embodiments, the system may include a switched fabric hierarchy (e.g., a PCIe hierarchy) and may realize efficient utilization of a shared I/O device (which may be an endpoint device in the switched fabric hierarchy) across multiple other physically separate computing nodes (e.g., other endpoint devices in the switched fabric hierarchy that are configured to act as processing nodes). The distributed processing node system may, collectively, execute a distributed application, such as a distributed database application or a large data processing application (e.g., a "big data" application), in different embodiments.

In some embodiments, the shared I/O device (which may be a network switch or a storage switch) may implement a single physical function (PF) and multiple virtual functions (VFs) in accordance with the SR-IOV standard. The root complex component of the switched fabric hierarchy (e.g., a computing node configured to perform the functionality of the root complex) may host a device driver for the physical function, but the device drivers for each of the virtual functions may be hosted by respective ones of the processing node endpoints. Each processing node endpoint in the system may be allocated a respective portion of the address map of the shared I/O device corresponding to one of the virtual functions.

In some embodiments, following the performance of an enumeration operation to discover the devices in the switched fabric hierarchy and initialization of the hierarchy by the root complex component (e.g., by a host driver or other process running on the root complex component), the processing node endpoints may access the virtual functions directly (e.g., without intervention by the root complex). For example, an endpoint may, during execution of a portion of a distributed application, access a resource associated with a virtual function by sending a request that targets an address within the portion of the address map of the shared I/O device that is allocated to the endpoint.

In some embodiments, interrupt logic in each endpoint may be configured to receive and handle interrupts generated by the virtual functions assigned to that endpoint. Data and interrupt traffic between endpoints and virtual functions may take place over peer-to-peer connections through PCI-to-PCI bridges within the fabric switch. Some exception conditions that involve the shared I/O device (and/or traffic between the shared I/O device and the other endpoints) may be communicated to and handled by the endpoint devices themselves (e.g., without intervention by the root complex). Other exception conditions and/or errors may be communicated to and handled by the root complex (e.g., by a host driver or other process running on the root complex component) as a proxy for the endpoint devices, and the root complex may notify the appropriate endpoints of the conditions or errors.

Figure 1:
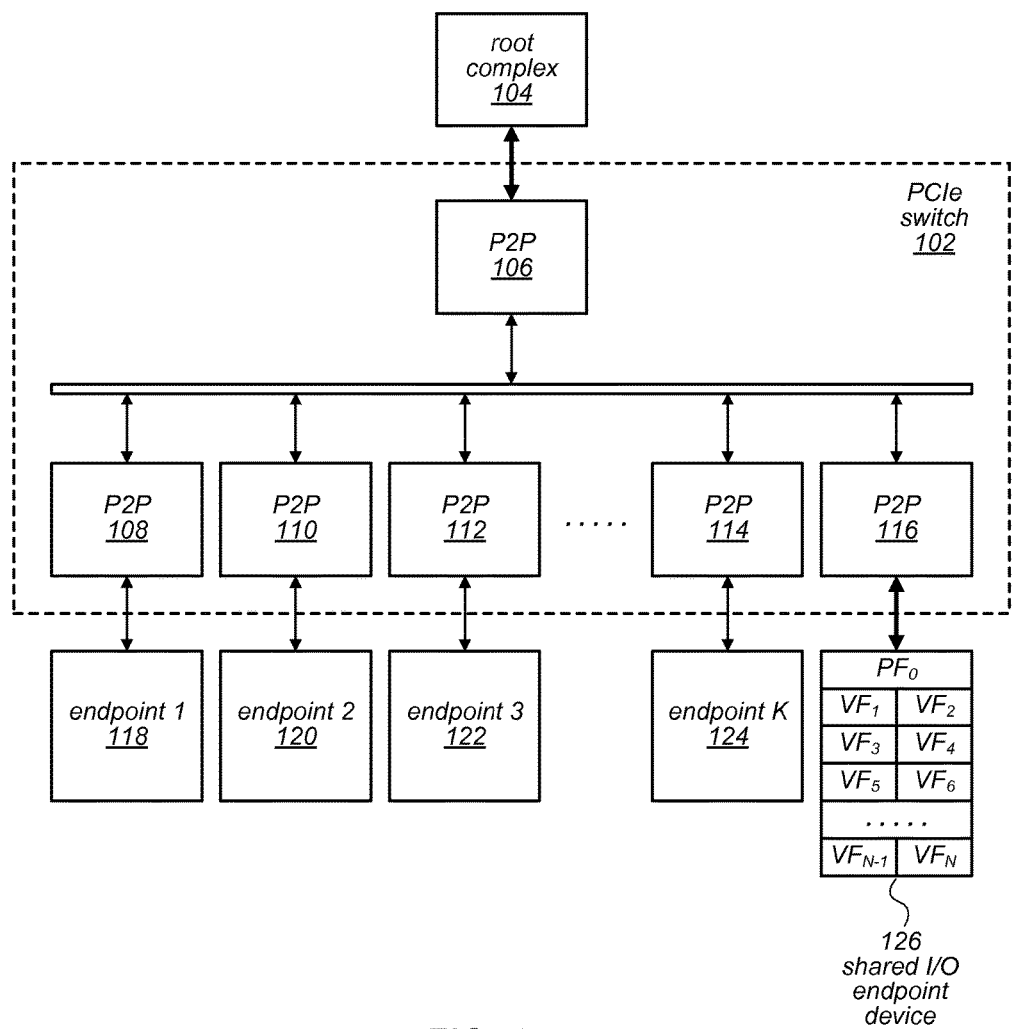
FIG. 1 is a block diagram illustrating one embodiment of a PCIe hierarchy that includes a single root complex, a shared I/O device, and multiple other endpoint devices.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The distributed computing systems described herein may enable efficient utilization of a shared I/O device across multiple physically separate processing nodes in an architecture that minimizes performance loss. For example, in at least some embodiments, the hardware and software for such a system (e.g., a system that contains a shared I/O device and multiple other computing nodes, including a root complex and numerous endpoint devices) may be designed such that each node has a highly efficient connection to the shared I/O device. Traditionally, a distributed processing system comprised of many endpoint devices, each individually capable of creating large bandwidth traffic, faces significant performance issues if traffic (including DMA traffic, interrupts, and/or programmed I/O) is not directly transferred between an endpoint and the shared I/O device. Current bus standards (e.g., various expansion bus standards such as the PCI and PCI Express standards) do not provide methods for a system comprised of multiple physically separate and independent hardware processing units to share an I/O device in a manner that efficiently routes high bandwidth I/O traffic, programmed I/O operations, and interrupt notifications directly between the I/O device and the particular processing unit targeted by the I/O device. However, in some embodiments, the systems described herein may implement a more efficient approach by basing their inter-node connections at the lowest level possible (e.g., at the level of the expansion bus infrastructure).

As described in more detail here, the systems described herein may implement some or all of the following features, in different embodiments:

- These systems may include modified address translation units (e.g., modified PCIe address translation units) that incorporate the physical memory of multiple physically independent nodes into a single large address space.
- Unlike in typical shared I/O solutions (which are inefficient in that all traffic is directed from the endpoint devices to the root complex before being distributed to other endpoint devices or virtual machine instances), these systems may allow traffic and/or control signals to flow directly between the shared I/O device and various endpoint processing nodes.
- The endpoint processing nodes in these systems may include dedicated hardware that allows them to receive interrupts directly from the shared I/O device.
- The operating system (OS) running on the root complex within a hierarchy in these systems may comprehend the shared I/O device architecture (for example, SR-IOV) but may allocate hierarchy resources such that the activities associated with a given virtual function (VF) that would, in traditional systems, reside in and be executed on the root complex, may instead be executed by the compute entity residing in an endpoint node that is affiliated with the VF.
- A software or firmware based communications agent may be established between each of the endpoint computing nodes in these systems (which are sometimes referred to herein as endpoint processing nodes) and the root complex in the same hierarchy, which may be used for any low bandwidth messaging needed for certain initialization functions and/or for exception handling.
- Error management operations that are regulated by the root complex within the hierarchy may include more functionality than in a traditional system. For example, the root complex, upon receipt of an error message from a device in the hierarchy may resolve endpoint-to-root complex, root complex-to-endpoint, and endpoint-to-endpoint traffic flows, as well as any switch detected errors, in such a way that contains the error and maintains the maximum number of operating nodes.

As noted above, standards such as the PCIe SR-IOV specification do not provide methods for a system comprised of multiple physically separate and independent hardware processing units to share an I/O device in a manner which efficiently routes high bandwidth I/O traffic, programmed I/O operations, and interrupt notifications directly between the I/O device and the particular processing unit targeted by the I/O device. However, some cluster-based systems that provide means for OS-level sharing of devices (such as OSF/1 AD, the Open Software Foundations Advanced Development kernel) allow a device physically attached to one node to be managed, via a message-passing system, by another node in the cluster. In some embodiments, the systems described herein may implement a more efficient approach by basing their inter-node connections at the lowest level possible (e.g., at the level of the expansion bus infrastructure).

In a high performance system, an endpoint may frequently perform block transfers of data between itself and memory within the root complex. In such systems, I/O interrupts may provide a low-latency, highly efficient means for communicating events to a device driver affiliated with a given endpoint and may be necessary to maintain high-bandwidth data movement and exception processing. In a system that includes a shared I/O device having a physical function (PF) and multiple virtual functions (VFs), the PF and each VF within the shared I/O device may be capable of issuing a unique interrupt to its affiliated driver.

A typical PCI Express (PCIe) hierarchy may include a single root complex (RC), multiple endpoint devices (EPs), and a PCIe switch. One embodiment of such a PCIe hierarchy (a hierarchy to which the techniques described herein may be applicable) is illustrated by the block diagram in FIG. 1. In this example, one of the endpoint devices (shown as shared I/O endpoint device 126) is a shared I/O device that is compliant with the PCISIG Single Root I/O Virtualization (SR-IOV) specification. In this example, the shared I/O endpoint device includes one physical function (PF) and N virtual functions (VFs). However, devices having more PFs and/or having any of a variety of schemes for associating VFs to a given PF are defined by the specification, and the techniques described herein may be applied in other embodiments having different numbers and/or combinations of PFs and VFs, as well. In this example, the PCIe hierarchy also includes multiple other endpoint devices (shown as elements 118-124), a PCIe switch 102 (which includes PCI-to-PCI interface mechanisms 106-116), and a node 104 that is configured as the root complex for the hierarchy. Note that PCI-to-PCI interface mechanisms such as interface mechanisms 106-116 may sometimes be referred to as PCI-to-PCI bridges. In this example, root complex 104 may include a device driver for the PF of the shared I/O device 126, as well as a respective device driver for each of the VFs of the shared I/O device (not shown). In this example, each endpoint device includes a root complex communication driver (not shown).

As described in more detail below, before the I/O system illustrated in FIG. 1 is used by any applications, the operating system (via the root complex) performs a discovery and initialization process in which bus numbers are established and a PCIe address map is created that allocates memory space for various resources needed by the other endpoint devices. In this example, the device drivers that run on the processor configured as the root complex are associated with the endpoint devices. As noted above, the shared I/O device, in this example, is partitioned into a PF and N VFs, each of which has a device driver in the root complex. Here, the PF driver can inform each of its subordinate VF drivers the resources that VF has been allocated.

Figure 2A:
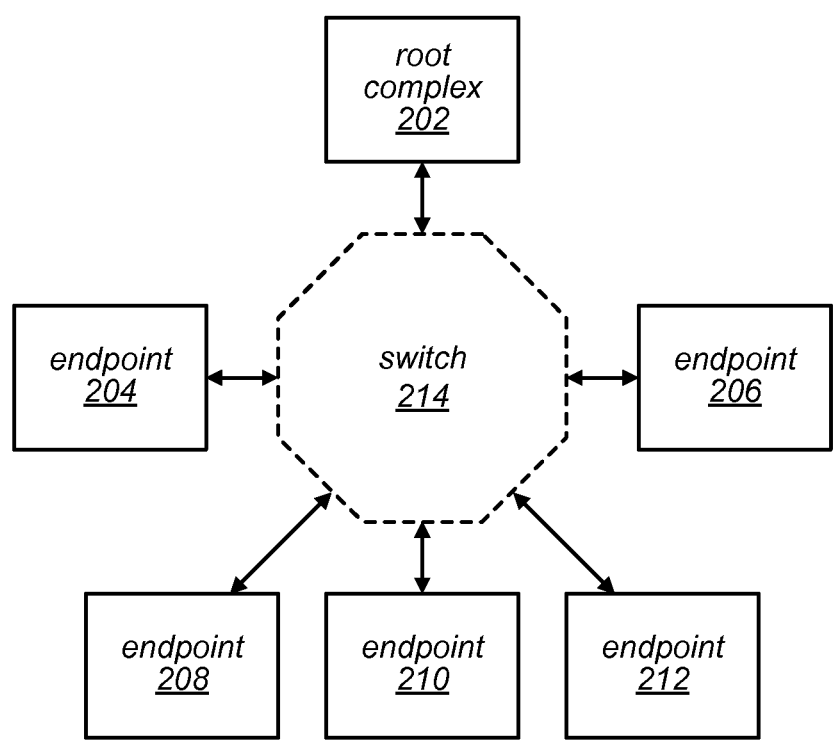
FIGS. 2A and 2B are block diagrams illustrating communication traffic in a system such as that illustrated in FIG. 1.
Figure 2B:
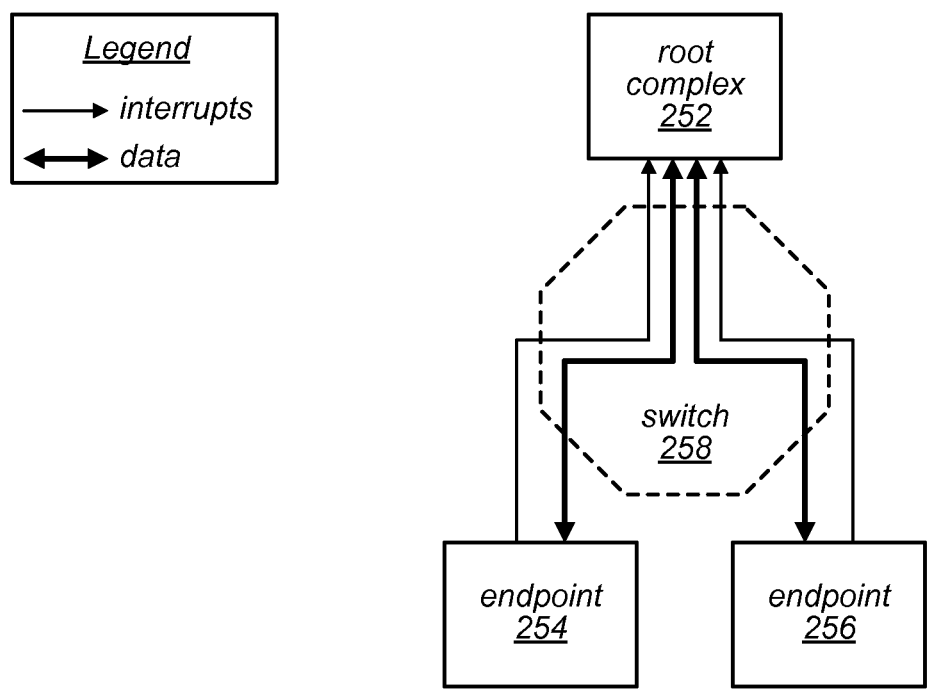

Although traffic can be sent directly between endpoint devices, in the typical PCIe hierarchy, data and interrupt traffic flow takes place between the endpoint devices and the root complex, as illustrated in FIGS. 2A and 2B. For example, FIG. 2A illustrates a view of the interconnections between the root complex and various endpoint devices in a typical PCIe hierarchy. In this example, the endpoint devices 204-212 and the root complex 202 communicate with each other through switch 214. Additionally, in this example, all data and interrupt traffic between the endpoint components passes through switch 214 to root complex 202, rather than directly between the endpoint components.

FIG. 2B illustrates the flow of data and interrupt traffic for a PCIe hierarchy similar to that depicted in FIG. 2A. As illustrated in this example, data may generally flow bi-directionally between the root complex 252 and endpoint devices 254 and 256, through switch 258. In this example, unidirectional interrupts generated by endpoint devices 254 and 256 may typically flow from the endpoint devices to root complex 252 through switch 258. Detailed descriptions of PCIe architecture and shared I/O devices may be found in the applicable industry specifications.

As described above, in a conventional PCIe hierarchy that includes a shared I/O device conforming to the SR-IOV standard, if the shared I/O device has a lot of resources on it, they can be split across multiple processes (all of which would typically reside within the root complex). In other words, in such systems, each of the specific physical functions and virtual functions is known by some process or virtual machine instance that resides in the root complex. However, some embodiments of the distributed processing systems described herein, all of the endpoint devices (not just the root complex) may be processing nodes, and each of them may have access to some portion of the resources within such a shared I/O device. In other words, rather than having all of the processing aggregated within one node (the root complex), it may be distributed across multiple nodes (e.g., a single root complex and multiple endpoint devices). In some embodiments, this distribution of processing may be invisible to the shared I/O device. In such embodiments, there may be no need to modify the hardware architecture of the shared I/O device itself (e.g., the shared I/O device may act the same way that it would in a conventional system), even though this architecture may operate such that each processing node has control over a slice of the shared I/O device (e.g., a slice that has been allocated to it).

In some embodiments of the distributed processing systems described herein there may be n processing nodes within a hierarchy that are physically separate, but the shared I/O device may be shared amongst all those distributed processing nodes. Note that a multi-root IOV (MR-IOV) standard defines some ways to handle similar hierarchies, but it has not been widely adopted and requires considerably more hardware to implement than the techniques described herein. The distributed processing systems described herein may exploit that fact that there is a standard defined for handling SR-IOV, even though that standard does not cover the type of distributed processing applications described herein. In these systems, some additional hardware and/or software (e.g., above what is typically needed to implement a system such as that described in FIG. 1 and in FIGS. 2A-2B) may be included to implement the improved communication mechanisms described herein.

Note that while the techniques described herein are presented in the context of a single root hierarchy, they may also be applicable to systems that include shared I/O devices implemented outside of the SR-IOV standard (e.g., shared I/O that is within a single piece of silicon and/or within a single node on a link). Note that, prior to the definition of the SR-IOV standard, there were various proprietary schemes for using multi-function devices. For example, prior to SR-IOV, there could be up to eight functions on a PCIe device without including switches inside of the PCIe device. Following the definition of the SR-IOV standard, the number of functions that could be included without adding a switch was expanded up to 256 functions. The techniques described herein may be applicable in any of these systems, in different embodiments, and the use of these techniques may allow a large number of processing nodes to share a shared I/O device without all of the traffic between the processing nodes and the shared I/O device having to go through the root complex.

Figure 3:
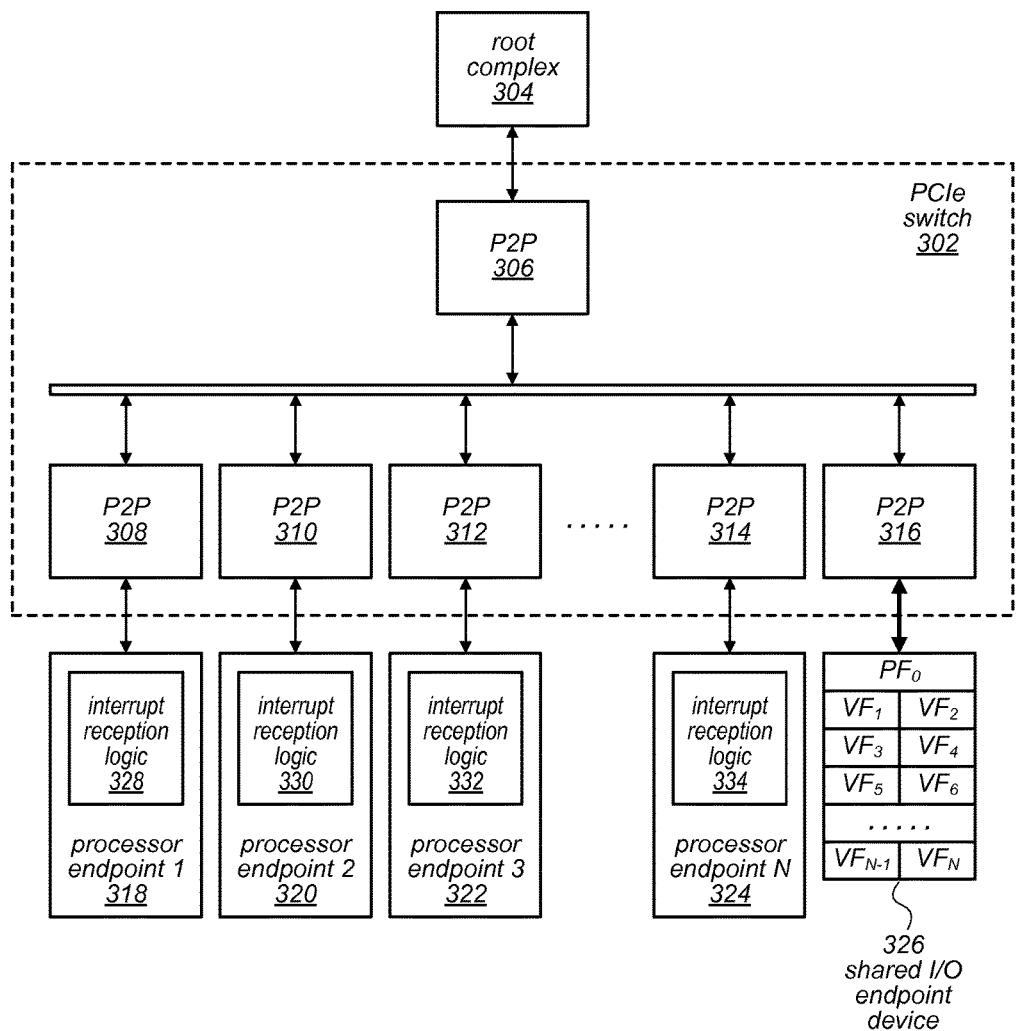
FIG. 3 is a block diagram illustrating one embodiment of a PCIe hierarchy that includes a single root complex, a shared I/O device, and multiple processing nodes configured as endpoint devices that have direct access to the shared I/O device.

One embodiment of a PCIe hierarchy that includes a single root complex, a shared I/O device, and multiple processing nodes configured as endpoint devices that have direct access to the shared I/O device (through the application of the techniques described herein) is illustrated by the block diagram in FIG. 3. As illustrated in this example, interrupt reception logic has been added to each of the endpoint devices. In addition, each endpoint device includes one or more device drivers for a corresponding virtual function of the shared I/O device (i.e., these device drivers do not all reside in the root complex), as well as a root complex communication driver.

More specifically, one of the endpoint devices (shown as shared I/O endpoint device 326) is a shared I/O device that is compliant with the SR-IOV specification. As in the example hierarchy illustrated in FIG. 1, the shared I/O endpoint device includes one physical function (PF) and N virtual functions (VFs). However, devices having more PFs and/or having any of a variety of schemes for associating VFs to a given PF are defined by the specification, and the techniques described herein may be applied in other embodiments having different numbers and/or combinations of PFs and VFs, as well. In this example, the PCIe hierarchy also includes multiple other endpoint devices (shown as processor endpoints 318-324), a PCIe switch 302 (which includes PCI-to-PCI interface mechanisms 308-316), and a node 304 that is configured as the root complex for the hierarchy. Note that PCI-to-PCI interface mechanisms such as interface mechanisms 306-316 may sometimes be referred to as PCI-to-PCI bridges. In this example, root complex 304 may include a device driver for the PF of the shared I/O device 326, but the respective device drivers for each of the VFs of the shared I/O device may reside in corresponding ones of the processor endpoints 318-324 rather than in root complex 304 (not shown). As described in more detail below, each of these processor endpoints includes interrupt reception logic that allows the endpoint to handle interrupts generated by a VF of the shared I/O device that is allocated to the endpoint. These are illustrated in FIG. 3 as interrupt reception logic 328-334 within processor endpoints 1-N (elements 318-324).

As described in more detail below, before the I/O system illustrated in FIG. 3 is used by any applications, the operating system (via the root complex) performs a discovery and initialization process in which bus numbers are established and a PCIe address map is created that allocates memory space for various resources needed by the other endpoint devices. In this example, a device driver that runs on the processor configured as the root complex is associated with the physical function (PF) of the shared I/O device 326, and each of the N virtual functions (VFs) of the shared I/O device has a device driver on a respective one of the processor endpoints 318-324.

The techniques described herein may, in various embodiments, address at least some of the needs of a system that includes a number of distributed, high performance processing nodes. In a PCIe framework, these nodes may be endpoint devices but may also include the root complex. In these systems, it may be desirable for all nodes to be able to efficiently access the shared I/O device directly and with minimum requirements for intermediate action by another node in the hierarchy. In various embodiments, a PCIe hierarchy in which these techniques have been implemented (such as the example PCIe hierarchy illustrated in FIG. 3) may exhibit some or all of the following differences when compared to conventional systems (e.g., systems that include a PCIe hierarchy such as the PCIe hierarchy illustrated in FIG. 1).

Rather than the virtual functions of the shared I/O device being owned by device drivers or virtual machine instances within the root complex, each processing endpoint node may own a partition of the shared I/O device.

Although the device driver for the physical function may still reside in the root complex, the endpoint devices, as processing nodes, may host the device drivers for the virtual functions that are affiliated with the shared I/O device.

After the root complex completes the initialization of the hierarchy devices (which may include an enumeration operation) and the setup procedures needed by the physical function driver (e.g., to set up the resources needed by the physical function), communications between a processing node (e.g., any processing endpoint 318-324 or root complex 304 in FIG. 3) and the shared I/O device may take place as direct communications. In these systems, subsequent to the initialization and setup procedures, peer-to-peer endpoint traffic in such systems may be extensive.

In systems in which the techniques described herein have been implemented, instead of the traditional north-south DMA traffic that goes between an endpoint and a root complex, peer-to-peer traffic from endpoint-to-endpoint may be the predominant method of communication in the PCIe hierarchy. In some embodiments, this peer-to-peer traffic may primarily be between a particular processing node and the shared I/O device, rather than between two of the processing nodes. However, peer-to-peer traffic between any two of the processing nodes may also be supported.

As noted above, in the systems in which techniques described herein have been implemented, the root complex may include a device driver for each endpoint device, which may facilitate communication between the root complex (e.g., for use in initialization and setup operations and/or for use in exception handling, in some cases). In addition, each of the endpoint devices may include multiple device drivers. One of the device drivers on each endpoint may serve as the driver for the communication channel that is part of that PCIe layer (e.g., the communication channel through which the root complex communicates, bi-directionally, with the endpoint to perform the initialization and setup operations and/or exception handling, in some cases). In these systems, each endpoint device may also include a device driver that runs a virtual function of the shared I/O device. As previously noted, this device driver may differ from a standard driver that was obtained with the hardware (e.g., the shared I/O device hardware). For example, it may have been modified to change the addresses through which the endpoint device accesses a particular portion of the shared I/O device to fit within the portion of the address space that is allocated to the endpoint device, and it may be modified to recognize and use the interrupt setup that the PCI layer driver provides at the endpoint device.

Note that, in the systems in which techniques described herein have been implemented, there may be no need to modify the fabric switch hardware or architecture (e.g., the PCIe switch) from that of a conventional system in order to implement direct communication between the shared I/O device and the endpoint devices. Instead, a standard switch (e.g., a standard PCIe switch, which is a transparent switch) may (according to the PCIe specification) be able to handle such peer-to-peer communications. In at least some embodiments, once the PCIe address space (which may be a 64-bit PCIe space) is set up, the root complex may know where everything is (e.g., how the space is going to be allocated per endpoint node). For example, when an enumeration operation is performed by the root complex, the root complex will be able to determine the amount of space that is being requested by each endpoint device (including the shared I/O device) on behalf of the PF and VFs.

In some embodiments, although conventional switch hardware may not be modified in order to support the implementation of the techniques described herein, an enumeration process may be used to set up and configure the switch so that it will route traffic (e.g., DMA traffic, interrupts, and/or programmed I/O) according to the way the address space has been allocated and the way the interrupts have been assigned. In one specific example system, each endpoint may be allocated a respective portion of a 64-bit address map. In this example, if endpoint 1 wants to communicate with the shared I/O device, it will know, through the communications channel driver that is established, the address of that particular shared I/O device, and which addresses it can use to communicate with it. Thus, the endpoint will know (based on the outcome of the enumeration) that, when it issues a request to access that address, the switch will simply route the request from the peer-to-peer interface mechanism (or bridge) over which is it receiving that transaction to the peer-to-peer interface mechanism (or bridge) for the shared I/O device. More specifically, the enumeration operation may be used to divide up the 64-bit space and allocate to each endpoint the requested amount of space that each endpoint needs inside of that 64-bit region, setting up the switch and its internal PCI-to-PCI bridges, as well as the endpoint devices, to enable PCI-to-PCI traffic. Once this is done, the device driver in endpoint 1 may ensure that messages are addressed correctly such that the switch will automatically route them to the right destination without necessarily having to pass through the root complex, as was the case in the conventional model of operation (in which all traffic flows from the endpoints north to the root complex).

Note that, in some embodiments of the systems described herein, each endpoint on the fabric (e.g., each endpoint on the PCIe fabric) is associated with an identifier (e.g., a routing identifier, or RID). In such embodiments, for configuration cycles and/or other traffic that runs only run north and south between each endpoint and the root complex, the fabric switch may route traffic based on those identifiers. However, another addressing model that routes traffic based on PCI addresses may be used with communication traffic that can flow from endpoint-to-endpoint in a peer fashion, as well as from the root complex to a particular endpoint. In some embodiments, there may be multiple decoders of different decoder types within each PCI-to-PCI bridge that are set up (e.g., by the operating system running on the root complex) during the enumeration process, which also assigns bus numbers. In such embodiments, one type of decoder in each PCI-to-PCI bridge may be used for routing between devices based on their identifiers, and a separate decoder within each PCI-to-PCI bridge may determine the address of a message or request, and may know how to route the message or request to another PCI-to-PCI bridge (i.e., the PCI-to-PCI bridge associated with the recipient) based on that address.

Figure 4A:
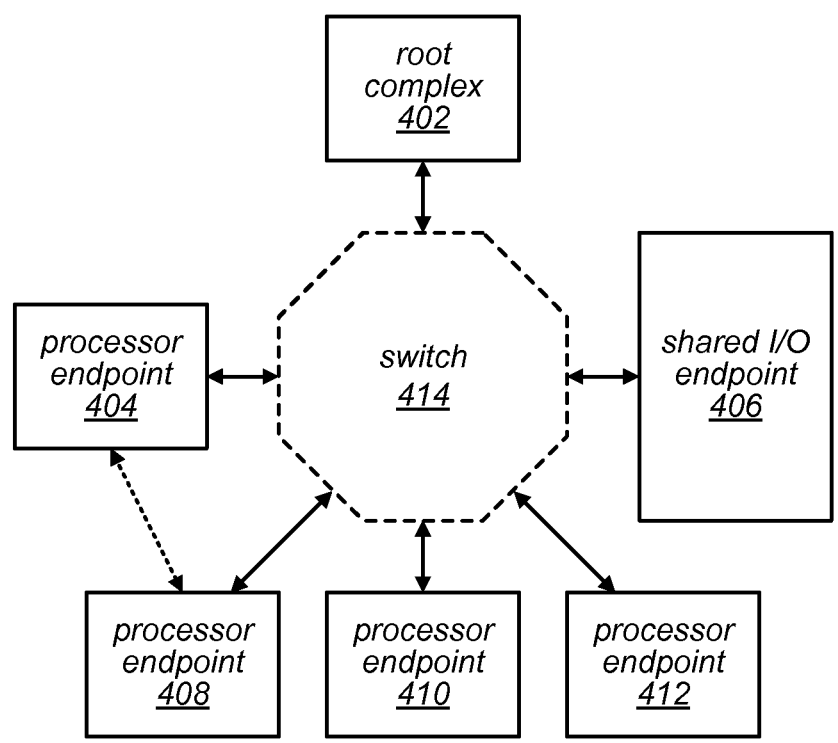
FIGS. 4A and 4B are block diagrams illustrating communication traffic in a system such as that illustrated in FIG. 3, according to some embodiments.
Figure 4B:
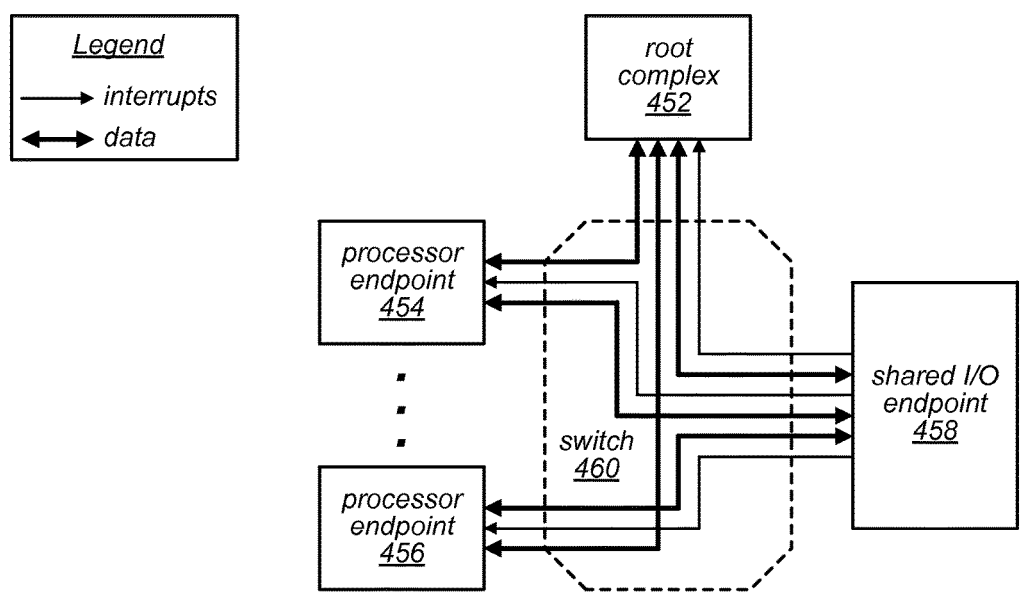

In some embodiments of the systems described herein (including, for example, in a system that includes the PCIe hierarchy illustrated in FIG. 3), data and interrupt traffic flow takes place between the endpoint devices and the root complex, as illustrated in FIGS. 4A and 4B. For example, FIG. 4A illustrates a view of the interconnections between the root complex and various endpoint devices in the PCIe hierarchy. In this example, the endpoint devices 404-412 (including shared I/O endpoint 406) and the root complex 402 may communicate with each other through switch 414. However, not all data and interrupt traffic between endpoints may need to pass through root complex 402. Instead, at least some of the data and interrupt traffic may be communicated between endpoint components directly over a peer-to-peer connection (through their respective PCI-to-PCI bridge components within switch 414). For example, the dotted line connecting processor endpoint device 404 and processor endpoint device 408 in FIG. 4A may represent such as connection, although the actual connection may be made through switch 414. A similar connection may be made between any pair of the endpoint devices illustrated in FIG. 4A, including between shared I/O endpoint device 406 and any of the processor endpoint devices 404, 408, 410, or 412 (not shown).

FIG. 4B illustrates the flow of data and interrupt traffic for a PCIe hierarchy similar to that depicted in FIG. 4A. As illustrated in this example, some data may flow bi-directionally (north and south) between the root complex 452 and particular endpoint devices 454 through 458, through switch 460. Other data traffic may flow bi-directionally between various pairs of endpoint devices (including between shared I/O endpoint 456 and various ones of the processor endpoint devices 454 through 456), again through switch 460 (but not through root complex 452). In this example, some unidirectional interrupts generated by shared I/O endpoint device 458 may flow from this endpoint device to root complex 452 through switch 460, while other unidirectional interrupts generated by shared I/O endpoint device 458 may flow from this endpoint device to specific ones of the processor endpoint devices 454 through 456 (again, through switch 460 but not through root complex 452).

Figure 5:
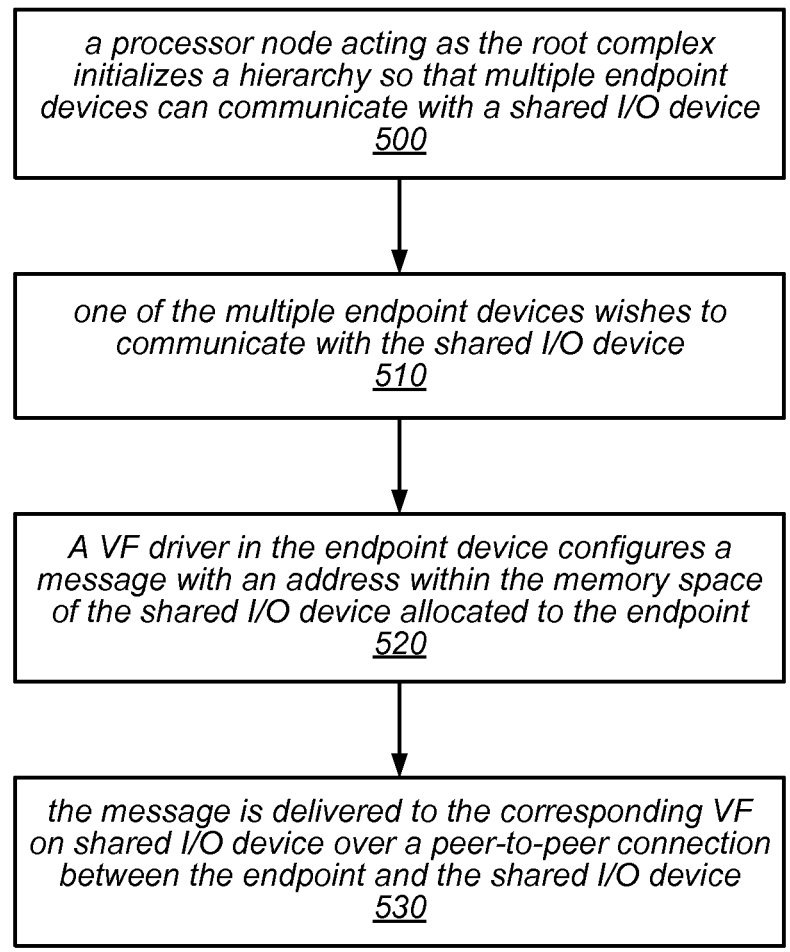
FIG. 5 is a flow diagram illustrating one embodiment of a method for an endpoint device in a distributed processing node system to communicate with a shared I/O device.

One embodiment of a method for an endpoint device in a distributed processing node system to communicate with a shared I/O device is illustrated by the flow diagram in FIG. 5. As illustrated at 500, in this example, the method may include a processor node that is configured as (or otherwise acts as) the root complex initializing a hierarchy (e.g., a PCIe hierarchy) so that multiple endpoint devices can communicate with a shared I/O device. The method may include one of the multiple endpoint devices wishing to communicate with the shared I/O device, as in 510.

In this example, the method may include a virtual function (VF) driver in the endpoint device configuring a message with an address that is within the portion of the memory space of the shared I/O device that is allocated to that particular endpoint device, as, in 520, and the message being delivered to the corresponding VF on the shared I/O device over a peer-to-peer connection between the endpoint and the shared I/O device (e.g., without going through the root complex), as in 530.

In some embodiments of the systems described herein, there may be a one-to-one mapping between the virtual functions (VFs) on the shared I/O device and the endpoint devices such that each endpoint device owns a portion of the address space of the shared I/O device corresponding to one VF. However, in other embodiments, other mappings may be possible. For example, in some embodiments, multiple VFs on the shared I/O device may map to a particular endpoint (e.g., may be accessed at an address within the portion of the address map that is allocated to that endpoint). However, it may or may not be the case that multiple endpoint devices can be mapped to the same VF. For example, in embodiments in which each endpoint device is allocated a different non-overlapping portion of the address space, it may be the case that a given VF that is accessed by its location within the address space can only be accessed by the endpoint to which that location is allocated. Note that, from a practical standpoint, this restriction may also simplify interrupt handling. For example, if multiple endpoint devices were mapped to the same VF, it might not be clear which of the endpoint devices would receive and/or handle interrupts generated by the VF. However, in other embodiments such a many-to-one mapping between endpoints and VFs may be supported by the underlying architecture. Note, however, that supporting this feature may require changes to interrupt handling and/or other functionality in the PCIe hierarchy.

Note that while in many of the systems described herein, the processor node that performs the functionality of the root complex includes a device driver or virtual machine instance to which the physical function of a shared I/O device is assigned (i.e., the PF may always be assigned to the root complex), the root complex may also have a VF mapped to it, in some embodiments. Note also that the techniques described herein may be applicable in embodiments in which the shared I/O device has more than one PF and in which any of a variety of approaches for associating VFs to a given PF are defined. In some such embodiments, all of the PFs may still be mapped to the root complex, while various ones of the VFs may either be mapped (as individual child VFs or in groups of VFs) to the root complex or to other endpoint devices (e.g., to the processor endpoints). For example, since a PF is likely to be involved in an above average number of configuration space transactions (when compared to the VFs), it may be impractical (or at least inefficient) to map any PFs to an endpoint device rather than to the root complex, regardless of how the mapping is done between the VFs and PFs on a shared I/O device that has one or more PFs.

As described herein, in some embodiments, the root complex may be responsible for establishing a hierarchical PCIe address map that places all of the resources necessary for a given VF of the shared I/O device within a region of the address map that is accessible by its associated endpoint (e.g., as part of an initialization operation). Note that this may exclude any portion of the address map that is given to communicating directly with the PF of the shared I/O device (for which, the endpoint may still need to go through the root complex). In some embodiments, the root complex, in conjunction with the PF driver, may communicate to each processing endpoint the location within the PCIe address map of the shared I/O device's resources that the endpoint's VF device driver must access. Subsequently, programmed I/O (PIO) accesses to control structures or any other entity within the shared I/O device that are allocated to that VF driver may be issued by the endpoint.

In some embodiments (e.g., during initialization), the root complex may perform an enumeration type operation (e.g., it may run enumeration software) in order to discover the PCIe hierarchy, including the shared I/O device and other endpoint devices (e.g., the processing nodes), and may make the resource assignments accordingly (e.g., in a manner similar to that used in conventional PCIe hierarchies). Subsequently, the endpoint devices (e.g., the distributed processing nodes that will be accessing the shared I/O endpoint device) may need to be made aware of the shared I/O endpoint and provided with the addresses that are allocated to them (i.e., the means by which they can communicate with the shared I/O device), since, as endpoint devices themselves, they may not have an ability to discover the shared I/O device. Therefore, following the enumeration process, the root complex (running another software process) may communicate to each of the distributed nodes (over the PCIe fabric itself) the information that each of those nodes needs in order to communicate with that shared I/O device.

In some embodiments, this software process (or another software process running on the root complex) may be responsible for setting up the special interrupt logic on the shared I/O endpoint so that it can and will deliver at least some of the interrupts it generates to the distributed nodes instead of to the root complex (as would be done in a conventional system). In other words, software running on the root complex may be configured to program how the interrupts for each VF on the shared I/O device will be distributed. In other words, during initialization, the root complex (and/or various software processes running thereon) may be responsible for configuring the PCIe hierarchy so that various combinations of accesses (e.g., different types of accesses) to the shared I/O device from particular ones of the other endpoint devices and traffic from the shared I/O to particular ones of the other endpoint device are enabled. Note that some accesses (e.g., those involving the configuration space of the PCIe hierarchy) may only be reachable through the root complex.

Figure 6:
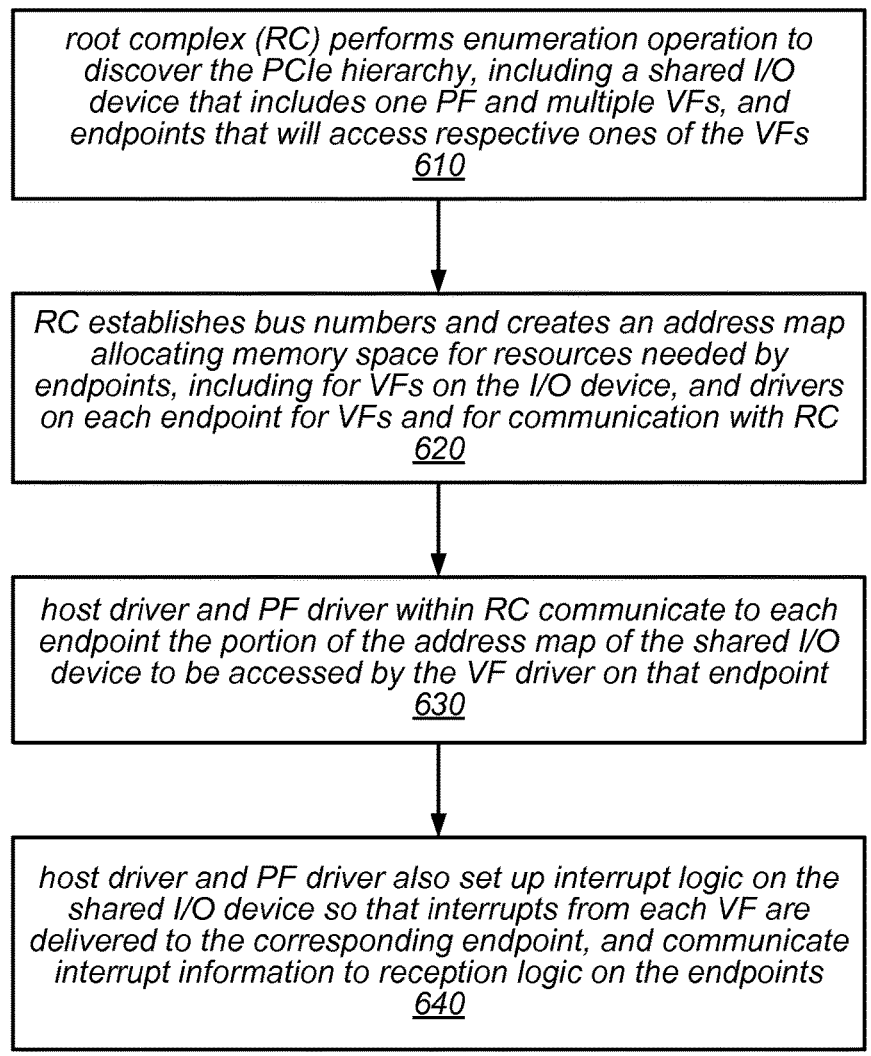
FIG. 6 is a flow diagram illustrating one embodiment of a method for initializing a PCIe hierarchy to allow direct communication between multiple endpoint devices and a shared I/O device.

One embodiment of a method for initializing a PCIe hierarchy to allow direct communication between multiple endpoint devices and a shared I/O device is illustrated by the flow diagram in FIG. 6. As illustrated at 610, in this example, the method may include the root complex (e.g., a component of the root complex, a host driver on the root complex, or another process executing on the root complex) performing an enumeration operation to discover the PCIe hierarchy, which includes a shared I/O device that includes one physical function (PF) and multiple virtual functions (VFs), and multiple other endpoint devices that will access respective ones of the VFs. As described herein, the method may include the root complex establishing bus numbers and creating an address map to allocate memory space on the endpoint devices (including on the shared I/O device) for resources needed by the various endpoint devices, as in 620. This may include allocating a portion of the address space for the virtual functions on the shared I/O device, and for drivers on each endpoint for respective ones of the VFs and for communication with the root complex.

As illustrated in this example, the method may also include the host driver on the root complex and/or the physical function driver within the root complex communicating to each endpoint device the portion of the address map of the shared I/O device that is to be accessed by the corresponding virtual driver on that endpoint device, as in 630. The method may also include the host driver on the root complex and/or the physical function driver within the root complex setting up the interrupt logic on the shared I/O device so that interrupts from each virtual function are delivered to the corresponding endpoint device, and communication information to the interrupt reception logic on each endpoint device so that the endpoint can configure itself to be able to receive and handle those specific interrupts, as in 640.

In some embodiments, the result of various enumeration/initialization processes may be a shared PCIe memory space that is available to the distributed nodes (directly) and the initialization of interrupts (e.g., message signaled interrupts, such as MSI-X type interrupts) for the shared I/O device and distributed nodes. In one example embodiment, at start-up, various components are initialized and provisioned such that each of the distributed processing nodes in the PCIe hierarchy can issue PCIe transaction layer packets (TLPs) needed to communicate within the hierarchy and via the shared I/O endpoint device, and can communicate with any distributed processing nodes that are outside the PCIe hierarchy (e.g., through a processing node that performs various management functions within the overall system). In this example, the start-up procedure may include, among other things: determining which of the distributed processing nodes will be configured to act as the root complex, accessing a device tree file describing the root complex PCIe subsystem architecture (which may include a description of the PCIe components, the interrupt controller, the memory within the PCIe address space, any special error or exception handling hardware, etc.), the root complex performing an enumeration process to build a logical I/O tree of PCIe devices in the PCIe hierarchy, attaching the endpoint device drivers and shared I/O device driver (for the PF) in the root complex, the root complex enabling the VFs in the shared I/O device, the root complex communicating endpoint addresses and protocol information to the distributed processing nodes, the root complex communicating the location and resources of the VFs to their corresponding endpoints, the root complex communicating interrupt vector information to the endpoints for the shared I/O device transactions they will receive and handle so that they can set up their interrupt reception logic to receive (and subsequently process) interrupts that are directed to them from the shared I/O device, the root complex instructing each endpoint to expand its logical PCIe I/O tree to include the node with which it communicates with the root complex plus one or more VFs of the shared I/O device, each endpoint attaching device drivers, enabling respective communication channels, and each endpoint establishing MSI-X type interrupt services for its VFs.

Note that, in general, the start-up procedures for systems that include the PCIe hierarchies described herein may also include tasks that are performed by a management processor (e.g., logic that resides outside of the PCIe hierarchy and/or the main system processor) to handle power management, resets, clocking, the sequences in which all of the nodes are booted up, and/or other rudimentary tasks for bringing up the overall system. These tasks may be out of band of the PCI communication fabric (e.g., the communications utilized to perform them may be $I^2C$ type communications or similar).

In some embodiments of the systems described herein (including, for example, in a system that includes the PCIe hierarchy illustrated in FIG. 3), an interrupt from the shared I/O device that (in a conventional system) that would typically target the root complex may instead be directed through the PCIe switch to the endpoint that is affiliated with the VF that issued the interrupt. As illustrated in FIG. 3, in order to make this work, each processing endpoint may be augmented with special hardware that is configured to receive and handle interrupts from the shared I/O device. For example, in conventional systems (e.g., in conventional systems that include a network interface controller or a disk controller), there will be some traffic (e.g., transaction layer packets) moving back and forth, and there will be interrupts that signal some event of note (e.g., when the system implements message signaled interrupts). In these conventional systems, endpoint devices typically issue interrupts but are not normally the recipients of interrupts. Therefore, in order to make this transparent to the shared I/O device and many of its device drivers, interrupt reception logic may be added to the endpoint devices.

For example, in embodiments that implement message signaled interrupts (e.g., MSI or MSI-X type interrupts, which are the standard convention used in PCIe), interrupt reception logic may be added to the endpoint devices to receive interrupts from the shared I/O device (which are posted writes), and it may be the role of the root complex, when initializing the PCIe hierarchy, to program the shared I/O device so that when it wants to target a particular process associated with a given VF, it generates a message that includes the addresses that are associated with the appropriate endpoint. Again note that there are some tasks that (according to the PCIe specification) an endpoint cannot perform. For example, in SR-IOV, there may be a need to access the configuration space and operate on one of the VFs inside the shared I/O device. However, an endpoint device cannot issue a configuration cycle. In this case, the endpoint may have to communicate with the root complex and (through a proxy) have that task performed. In at least some embodiments of the systems described herein, the overall system may include a service layer for this type of messaging that the root complex may set up between itself and each processing node so that such services can be enabled.

Figure 7:
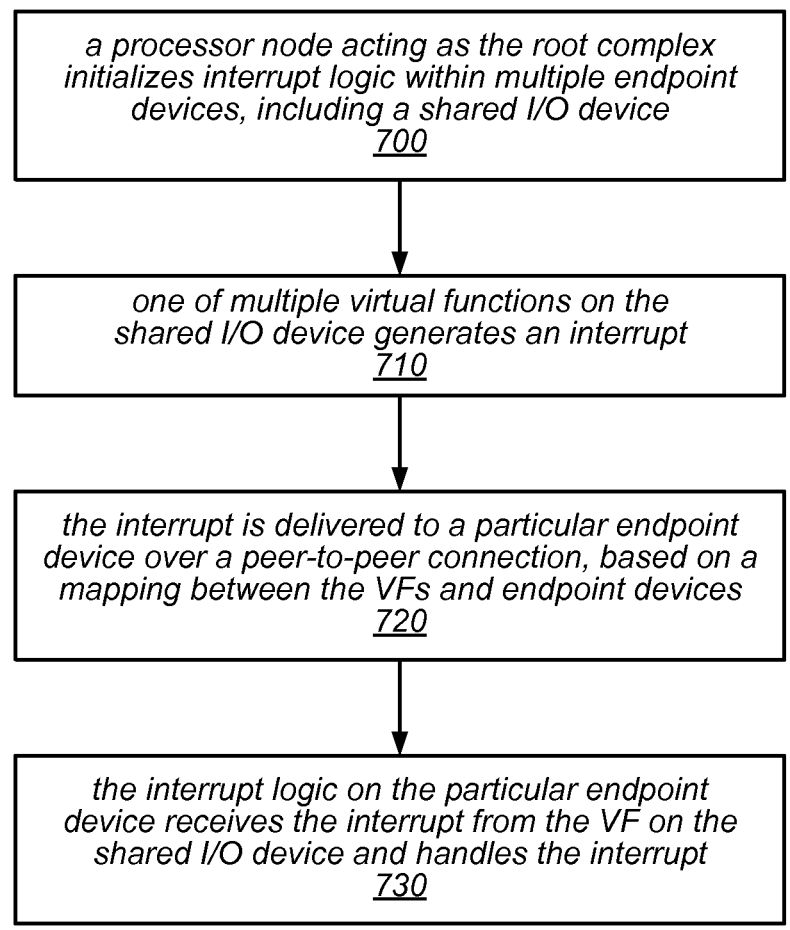
FIG. 7 is a flow diagram illustrating one embodiment of a method for managing interrupts from a shared I/O device in a distributed processing node system.

One embodiment of a method for managing interrupts from a shared I/O device in a distributed processing node system is illustrated by the flow diagram in FIG. 7. As illustrated at 700, in this example, the method may include a processor node that is configured as (or otherwise acts as) the root complex initializing interrupt reception logic within multiple endpoint devices, including a shared I/O device. The method may also include one of multiple virtual functions on the shared I/O device generating an interrupt, as in 710.

As illustrated at 720, in this example, rather than the interrupt being delivered to the processor node that is configured as (or acts as) the root complex, the method may include the interrupt being delivered to a particular endpoint device over a peer-to-peer connection, based on a mapping between the virtual functions implemented on the shared I/O device and the multiple endpoint devices (e.g., a mapping that associates each virtual function with a respective one of the multiple endpoint devices). The method may also include the interrupt reception logic on the particular endpoint device receiving the interrupt from the VF on the shared I/O device and handling the interrupt, as in 730. For example, an interrupt generated by the shared I/O device may signal that a task on which the endpoint device (e.g., is a node in a distributed processing system) is waiting has been completed. In response to receiving the interrupt, the endpoint device may proceed with other tasks that are dependent on the completion of the shared I/O task.

In some embodiments of the systems described herein, exception handling and/or error management may be implemented differently than in conventional systems, particularly with respect to endpoint-to-endpoint communications. For example, certain types of exceptions (e.g., interrupts and/or other types of exceptions that may be signaled through low-latency messaging between endpoint devices) may be handled by the endpoint devices themselves. However, when certain types of errors take place (including, e.g., errors that take place between the root complex and endpoint traffic flows), they may be sent to the root complex to be handled. For example, the error may be associated with a switch through which traffic going between the root complex and the endpoint passes. Note that, in the systems described herein, the majority of the traffic may be endpoint-to-endpoint traffic. In some cases, errors associated with these traffic flow may be handled by the root complex, in which case the root complex may have to examine registers inside the endpoint devices in order to make the appropriate decisions to keep the maximum number of nodes up and running and/or to perform any sort of required clearing of errors (e.g., in a restoration of process). Therefore, in some embodiments of the systems described herein, the exception and error handling implemented in the system (particularly for error or exception conditions related to endpoint-to-endpoint traffic) may be richer than in a conventional system.

In some embodiments, there may be different classifications of errors. For some classes of errors, when an error is encountered, the endpoint (which is a distributed processing node) that includes the device driver for the associated VF may become aware of some of the error directly and may be able to attempt a retry or otherwise attempt to handle the error. However, for other classes of errors, the endpoint may not be notified about the error directly. In some embodiments, at least some of the errors and/or exception cases that are to be handled by a VF driver on an endpoint may require access to a configuration space register within a VF of the shared I/O device. For example, the system may utilize Advanced Error Reporting (AER) registers (which reside in configuration space) for reporting and/or handling errors. Since the PCIe protocol does not permit an endpoint to issue configuration space requests, the root complex may, as a proxy, issue configuration space requests on behalf of an endpoint that alerts the root complex when the access is needed.

In some embodiments, all error handling may go through the root complex. In such embodiments, even though an error may have involved a flow between a particular endpoint and the shared I/O device, the root complex may act as a third party that is involved in the handling of that error. As noted above, these systems may take advantage of Advanced Error Reporting (as defined by the PCIe specification) and special error messaging in order to handle errors. For example, when an error is encountered, the shared I/O endpoint device may send out a special type of packet as an error message packet, and these types of message may only be able to flow from the shared I/O device up to the root complex. In some embodiments, an additional layer of logic (and/or software) may be implemented to deal with the fact that the error notification only went to the root complex and not to the individual distributed node (endpoint) that was involved in the error. This additional logic and/or software may be configured to examine the information in the error packet and then communicate to the individual distributed node (endpoint) an indication that it was associated with that particular error. One such error may involve an attempt by an endpoint to access an invalid PCI address within the shared I/O endpoint device.

In another specific example, if the shared I/O device issues a read request to another endpoint, but it issues it to an address inside that endpoint that it should not be directed to, the destination endpoint may reply with a "completer abort" response. In this case, the notification that this set of events took place may percolate up to the root complex. The root complex, in response to receiving notification, will need to decide what to do. In a conventional system, the traffic flows would all be between the root and the endpoint devices, and the error would be associated with that flow. However, in this example, the error occurred in a traffic flow between two endpoint devices. Therefore, when the root complex may need to examine the error registers of the devices involved (and, in some cases, the switch) to determine: which (if any) device was at fault, which (if any) device should be shut down, which (if any) device needs to be restarted, etc. In other words, the root complex may need to determine, for example, whether the endpoint that issued the "completer abort" response should not have issued that response, or whether the address that came out of the shared I/O device was a bad address. In some embodiments, the operating systems that deal with peer-to-peer traffic may include some of the error-handling code that may be used in handling this situation, once it has been identified, but this may not be common in all of the architectures to which the techniques described herein may be applied.

In at least some of the systems described herein, there may be errors involving the shared I/O device that are managed entirely by the root complex (e.g., using error handling methods prescribed by the PCIe specification and protocols). In addition, there may be other errors involving the shared I/O device that are handled primarily by the root complex, but for which some information is exchanged between the shared I/O device and the corresponding endpoint device. For example, certain errors may result in the shared I/O device using predominantly proprietary means to inform the corresponding driver on an endpoint device that an error event occurred. For instance, an error detected by the shared I/O device that may or may not require configuration space accesses by the root complex may issue an error message to the root complex (if so enabled) and may also issue a specific interrupt to the endpoint. A driver on the endpoint may determine (based on that interrupt) the error that occurred and may, itself, perform an appropriate level of error management and recovery. In other words, a shared I/O device may notify the endpoint of an error directly. However, the shared I/O device may not use PCIe error message packets to notify the endpoint of an error, but may use other means to communicate with the endpoint (e.g., in embodiments in which those two devices implement their own protocols with which to communicate information for certain types of errors). In one example, an error termination response, such as an unsupported request (UR) or completer abort (CA) response, may be sent to an endpoint that is associated with an error in addition to an error message packet being sent to the root complex. In another example, the shared I/O device may post information about an error in a location that is accessible by the virtual function driver hosted in the endpoint device. In some embodiments, the shared I/O device may send an interrupt indicating an error status to the endpoint device, in response to which the virtual function driver may examine such a location and take appropriate action.

Figure 8:
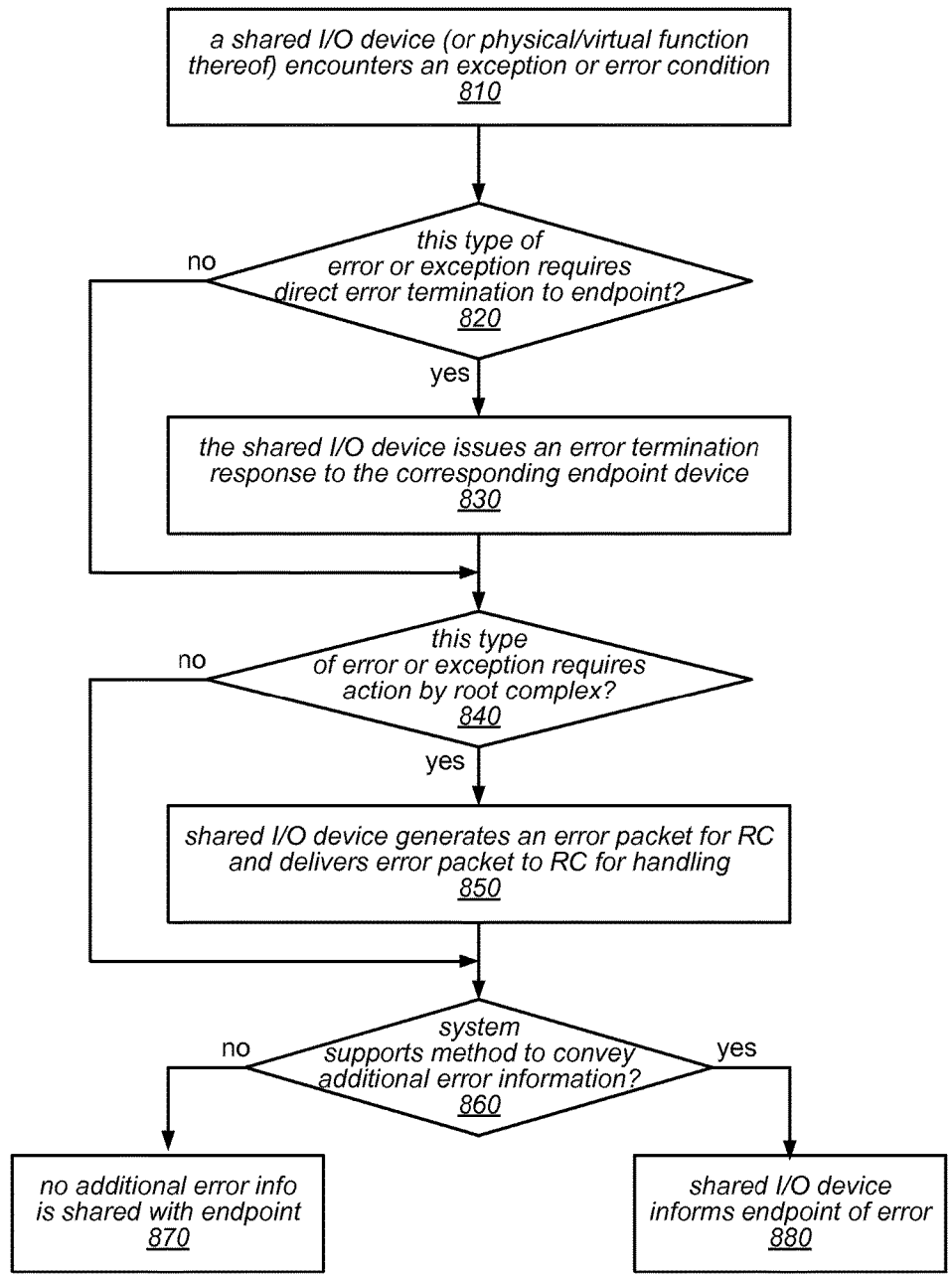
FIG. 8 is a flow diagram illustrating one embodiment of a method for handling exceptions and errors in a distributed processing node system.

One embodiment of a method for handling exceptions and errors in a distributed processing node system is illustrated by the flow diagram in FIG. 8. As illustrated at 810, in this example, the method may include a shared I/O device (or a physical or virtual function thereof) encountering an exception or error condition. If handling the type of error or exception that was encountered requires a direct error termination response to an associated endpoint device, shown as the positive exit from 820, the method may include the shared I/O device issuing an error termination response to the corresponding endpoint device, as 830. For example, the shared I/O device may terminate a non-posted request with an unsupported request (UR) or completer abort (CA) response to the endpoint, for certain error cases. If handling the type of error or exception that was encountered does not require a direct error termination response to an associated endpoint device, shown as the negative exit from 820, no such response may be issued.

As illustrated in this example, if handling the type of error or exception that was encountered requires action by the root complex (e.g., if it requires access to the configuration space within the hierarchy, such as to advanced error reporting registers or other restricted/privileged locations), the method may include the shared I/O device generating an error packet for the processing node that is configured as (or otherwise acts as) the root complex (which may be the only processing node able to access the configuration space), and the shared I/O device delivering the error packet to the processing node that is configured as (or acts as) the root complex for handling. This is illustrated in FIG. 8 by the positive exit from 840 and element 850. If, on the other hand, handling the type of error or exception that was encountered does not require action by the root complex, shown as the negative exit from 840, no such error message packet may be generated and delivered.

As illustrated in FIG. 8, if the system supports a method to convey additional information about the error to the endpoint involved in the error (shown as the positive exit from 860), the method may include the shared I/O device informing the endpoint (e.g., the processing node endpoint that is associated with the virtual or physical function that encountered the error) of the error, as in 880. However, if the system does not support a method to convey additional information about the error to the endpoint involved in the error (shown as the negative exit from 860), no additional error information may be shared with the endpoint (as shown in 870).

The techniques described herein for implementing virtualized I/O device sharing within a distributed processing node system may be applied in any of a variety of distributed systems, in different embodiments. In one example, the system may implement a distributed database architecture in which the overall performance is dependent on the interconnect bandwidth between processing nodes. In this example, the system may include a hybrid interconnect fabric consisting of a PCIe fabric and a fabric that is compliant with the InfiniBand™ standard developed by the InfiniBand Trade Association, and the shared I/O device may be a PCIe-to-InfiniBand host channel adaptor. In this system, in order to meet performance goals, each PCIe based node (endpoint) may require an efficient hardware and software communication path to the PCIe-to-InfiniBand host channel adaptor. Through this adapter, each of the PCIe based nodes (endpoints) may establish an efficient communication path to additional devices on the InfiniBand fabric.

In other embodiments, any system that relies on multiple PCIe endpoint devices sharing a virtualized I/O device may benefit from the techniques described herein. In different embodiments, any of a variety of other types of I/O devices may be shared between multiple distributed processing nodes. These may include, for example, a high speed network adapter (e.g., a 100 Gbit/s Ethernet adapter or a Fibre Channel adapter), a storage adapter, or a bridge to another type of fabric. In other embodiments, the shared I/O device may be a standalone I/O device, rather than a bridge to a different network or a different type of fabric. In addition, while the techniques for implementing virtualized I/O device sharing within a distributed processing node system are described herein primarily in terms of a PCIe hierarchy, they may be implemented in systems in which there is a switched fabric on which a shared I/O device with multiple virtual functions can be made accessible to multiple other devices on the fabric using these techniques (including, for example, partitioning the address pace of the shared I/O device and setting up its interrupts so that interrupts from a particular VF would be assigned to a particular other device on the fabric).

Example System

Figure 9:
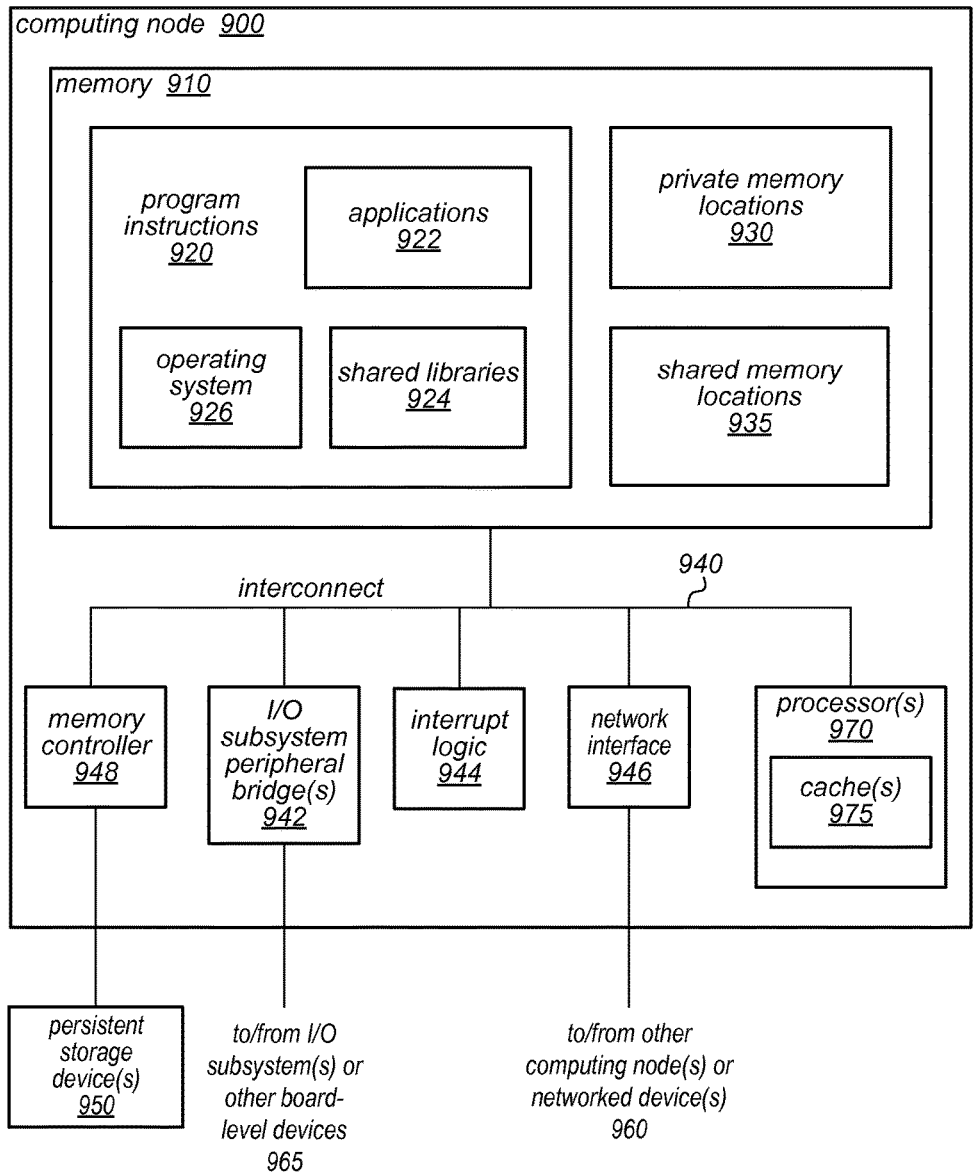
FIG. 9 illustrates a computing node that is configured to implement at least some of the methods described herein, according to various embodiments.

FIG. 9 illustrates a computing node that is configured to implement some or all of the methods described herein, according to various embodiments. The computing node 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In some embodiments, computing node 900 may be one of a plurality of computing nodes or other components in a distributed processing node system, as described herein. For example, computing node 900 may represent a processing node, a shared I/O device, a processor endpoint node in an I/O subsystem, or a node configured as the root complex for a particular hierarchy of nodes, or may implement some or all of the functionality of a network or fabric switch, in different embodiments. In different embodiments, such a computing node may include any or all of the components illustrated in FIG. 9, as well as other components that are not shown.

Some of the functionality for implementing virtualized I/O device sharing within a distributed processing node system, as described herein, may be provided as (or invoked by) a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computing node 900 may include one or more processors 970; each may include multiple cores, any of which may be single or multi-threaded. For example, multiple processor cores may be included in a single processor chip (e.g., a single processor 970), and multiple processor chips may be included on a CPU board, two or more of which may be included in computing node 900. In various embodiments, one or more of the processors 970 may be (or include) a special-purpose processor core. Each of the processors 970 may include a cache 975 or a hierarchy of caches, in various embodiments. As illustrated in this example, computing node 900 may include a memory controller 948 and/or a network interface 946 (which may implement an interface according to the PCIe standard or another switched fabric interface, in some embodiments). Computing node 900 may also include one or more I/O subsystem peripheral bridges 942 (which may include, or may provide an interface to a subsystem that includes, a PCI-to-PCI bridge), and interrupt logic 944 (e.g., which may include circuitry for implementing interrupt reception logic, as described herein).

As illustrated in FIG. 9, computing node 900 may also include or have access to one or more persistent storage devices 950 (e.g. optical storage, magnetic storage, hard drive, tape drive, solid state memory, etc., that is external to, but accessible by, computing node 900), and one or more system memories 910 (e.g., one or more of cache, SRAM, DRAM, RDRAM, EDO RAM, DDR 10 RAM, SDRAM, Rambus RAM, EEPROM, etc.). In some embodiments, system memory 910 may store a portion of a data set for an application on which processor(s) 970 may operate locally. For example, memory 910 on computing node 900 may include local storage (e.g., within private memory locations 930 or shared memory locations 935) for data structures, elements of which may be the targets of various functions of a distributed application, portions of which execute on computing node 900. In some embodiments, memory 910 may include persistent storage (e.g., for storing firmware or configuration parameter values that are fixed for a given computing node or a given set of configuration registers). In other embodiments, configuration registers or configuration parameters stored in system memory 900 may be programmable (e.g., at runtime). Various embodiments of computing node 900 may include fewer or additional components not illustrated in FIG. 9 (e.g., video cards, audio cards, additional network interfaces, peripheral devices, a network interface such as an ATM interface, an Ethernet interface, a Frame Relay interface, etc.)

In this example, the one or more processors 970, the memory controller 948 (which may provide access to storage devices 950), the I/O subsystem peripheral bridges 942 (which may provide access to an I/O subsystem such as that illustrated in FIG. 3 and/or to other board-level interconnect-based devices, shown as 965), the interrupt logic 944, the network interface 946 (which may provide access to other computing nodes or networked devices 960 in the system), and the system memory 910 may be coupled to the system interconnect 940. One or more of the system memories 910 may contain program instructions 920. Program instructions 920 may be executable to implement one or more applications 922 (which may include a portion of a distributed application that accesses a shared I/O device in order to perform various physical or virtual functions thereof), shared libraries 924, or operating systems 926. In various embodiments, program instructions 920 may be encoded in platform native binary, any interpreted language such as Java™ byte-code, or in any other language such as C/C++, Java™, etc. or in any combination thereof. The program instructions 920 may include functions, operations and/or other processes usable in implementing virtualized I/O device sharing within a distributed processing node system, as described herein. Such support and functions may exist in one or more of the shared libraries 924, operating systems 926, or applications 922, in various embodiments. The system memory 910 may further comprise private memory locations 930 and/or shared memory locations 935 where data (including portions of a data set for an application 922 and/or various configuration parameter values) may be stored. For example, private memory locations 930 and/or shared memory locations 935 may store data accessible to concurrently executing threads, processes, or transactions, in various embodiments. In addition, the system memory 910 and/or any of the caches of processor(s) 970 may, at various times, store data that has been fetched (or prefetched) from one of system memories 910 and/or from storage devices 950 by (or on behalf of) an application executing on computing node 900. Note that the system memory 910 and/or any of the caches of processor(s) 970 may, at various times, store any other data usable in implementing the techniques described herein, some of which may include values that are configurable by the programmer or by a user.

Although various embodiments have been described above in considerable detail, numerous variations and modifications will become apparent to those skilled in the art once the above disclosure is fully appreciated. For example, although many of the embodiments are described in terms of particular types of switched fabric networks, shared I/O devices, and/or system architectures, it should be noted that the techniques and mechanisms disclosed herein for implementing virtualized I/O device sharing within a distributed processing node system may be applicable in other contexts in which there are multiple processing nodes that access portions of a shared I/O device having virtual functions, and that may benefit from the techniques described herein for implementing efficient data and interrupt traffic flows. It is intended that the following claims be interpreted to embrace all such variations and modifications.

What is claimed is:

1. An apparatus, comprising:
   one or more processors;
   a memory comprising program instructions that when executed on the plurality of processors cause the plurality of processors to perform at least a portion of a distributed application;
   a network interface that connects the apparatus to a switched fabric hierarchy;
   interrupt reception logic configured to receive interrupts generated by one of a plurality of virtualized functions of a shared endpoint device in the switched fabric hierarchy; and
   two or more device drivers;
   wherein a first one of the two or more device drivers is configured to exchange communication traffic with a root complex component in the switched fabric hierarchy during initialization of the apparatus; and
   wherein, during execution of the distributed application, a second one of the two or more device drivers is configured to provide access, by the at least a portion of the distributed application, to the one of the plurality of virtualized functions of the shared endpoint device in the switched fabric hierarchy, wherein the one of the plurality of virtualized functions is allocated to the apparatus.

2. The apparatus of claim 1, wherein other ones of the plurality of virtualized functions of the shared endpoint device are not allocated to the apparatus.

3. The apparatus of claim 1,
   wherein, during execution of the distributed application, data traffic is communicated between the apparatus and the shared endpoint device via a peer-to-peer connection through a network switch of the switched fabric network.

4. The apparatus of claim 1, wherein the interrupts are received from the shared endpoint device via a peer-to-peer connection between the apparatus and the shared endpoint device.

5. A method, comprising:
   assigning, by a root complex component in a switched fabric hierarchy, one of a plurality of virtualized functions of a shared endpoint device in the switched fabric hierarchy to one of a plurality of processing endpoint devices in the switched fabric hierarchy, wherein said assigning comprises allocating a portion of an address map associated with the shared endpoint device to the one of the plurality of processing endpoint devices;
   initializing interrupt reception logic in the one of the plurality of processing endpoint devices, wherein initializing the interrupt reception logic comprises configuring the interrupt reception logic to receive interrupts from the shared endpoint device on behalf of the one of the plurality of virtualized functions;
   assigning, by the root complex component, another one of the plurality of virtualized functions of the shared endpoint device to another one of the plurality of processing endpoint devices in the switched fabric hierarchy, wherein said assigning comprises allocating a portion of an address map associated with the shared endpoint device to the other one of the plurality of processing endpoint devices;
   accessing, by a portion of a distributed application executing on the one of the plurality of processing endpoint devices, a location within the portion of the address map that is allocated to the one of the plurality of processing endpoint devices; wherein said accessing is performed over a peer-to-peer connection between the one of the plurality of endpoint devices and the shared endpoint device and is performed without intervention from the root complex component.

6. The method of claim 5, wherein said accessing is performed using a device driver that is hosted on the one of the plurality of processing endpoint devices for accessing the one of the plurality of virtualized functions of a shared endpoint device.

7. The method of claim 6, wherein said initializing comprises dividing the address map associated with the shared endpoint device among the plurality of processing endpoint devices.

8. The method of claim 6, wherein said initializing comprises performing an enumeration operation to discover devices within the switched fabric hierarchy.

9. The method of claim 5,
wherein the method further comprises initializing the switched fabric hierarchy; and
wherein said assigning and said allocating are performed during said initializing.

10. The method of claim 5,
wherein the method further comprises receiving, by the interrupt reception logic, an interrupt that was generated by the one of the plurality of virtualized functions; and
wherein the interrupt is received from the shared endpoint device via a peer-to-peer connection between the one of the plurality of processing endpoint devices and the shared endpoint device.

11. The method of claim 5, further comprising:
generating, by the shared endpoint device in response to an error or exception condition involving communication traffic between the one of the plurality of processing endpoint devices and the shared endpoint device, an error message; and
communicating the error message to the root complex component.

12. The method of claim 11, further comprising:
performing, by the root complex component in response to receiving the error message, an exception handling operation; and
communicating, by the root complex component to the one of the plurality of processing endpoint devices, an indication of the error or exception condition.

13. A system, comprising:
a computing node configured as a root complex component in a switched fabric hierarchy;
two or more computing nodes configured as processing endpoints in the switched fabric hierarchy;
a shared endpoint device in the switched fabric hierarchy; and
a network switch for the switched fabric network that connects the root complex component, the processing endpoints, and the shared endpoint device;
wherein the shared endpoint device implements multiple virtual functions, each of which is accessible by a respective single one of the processing endpoints through a device driver hosted on the processing endpoint;
wherein each of the processing endpoints comprises interrupt reception logic configured to receive interrupts generated by one of the multiple virtual functions; and
wherein accesses to each of the multiple virtual functions by the respective single one of the processing endpoints are performed via peer-to-peer connections.

14. The system of claim 13, wherein the shared endpoint device is an input/output (I/O) device, a network adapter, or a storage adapter.

15. The system of claim 13,
wherein the shared endpoint device further comprises a physical function; and
wherein the root complex component comprises a device driver for the physical function.

16. The system of claim 15, wherein accesses to the physical function by the two or more computing nodes configured as processing endpoints are made by the root complex component on behalf of the two or more computing nodes configured as processing endpoints.

17. The system of claim 13, wherein the shared endpoint device in the switched fabric hierarchy implements single root input/output (I/O) virtualization.

18. The system of claim 13,
wherein the two or more computing nodes configured as processing endpoints collectively execute a distributed application; and
wherein, during execution of the distributed application, one of the two or more computing nodes configured as processing endpoints accesses the one of the multiple virtual functions that is accessible by the one of the two or more computing nodes.

* * * * *